United States Patent
Gross et al.

(10) Patent No.: US 9,665,786 B2
(45) Date of Patent: May 30, 2017

(54) CONFIRMING AUTOMATICALLY RECOGNIZED HANDWRITTEN ANSWERS

(71) Applicant: CONDUENT BUSINESS SERVICES, LLC, Dallas, TX (US)

(72) Inventors: Eric M. Gross, Rochester, NY (US); Gary W. Skinner, Rochester, NY (US); Safwan R. Wshah, Webster, NY (US); Isaiah L. Simmons, Jr., Rochester, NY (US)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 14/627,457

(22) Filed: Feb. 20, 2015

(65) Prior Publication Data

US 2016/0247035 A1 Aug. 25, 2016

(51) Int. Cl.
*G06K 9/00* (2006.01)
*G06K 9/18* (2006.01)

(52) U.S. Cl.
CPC ..................................... *G06K 9/18* (2013.01)

(58) Field of Classification Search
None
See application file for complete search history.

(56) References Cited

U.S. PATENT DOCUMENTS

| | | | |
|---|---|---|---|
| 5,559,897 A | 9/1996 | Brown et al. | |
| 5,596,698 A | 1/1997 | Morgan | |
| 5,687,254 A * | 11/1997 | Poon | G06K 9/00429 382/187 |
| 5,864,635 A | 1/1999 | Zetts et al. | |
| 6,304,667 B1 | 10/2001 | Reitano | |
| 6,956,969 B2 * | 10/2005 | Loudon | G06K 9/6297 382/185 |
| 7,506,271 B2 * | 3/2009 | Wang | G06K 9/00436 715/809 |
| 7,580,551 B1 | 8/2009 | Srihari et al. | |
| 7,715,629 B2 | 5/2010 | Abdulkader | |
| 7,899,251 B2 * | 3/2011 | Slavik | G06K 9/00422 382/181 |
| 8,953,228 B1 * | 2/2015 | Mehers | H04N 1/00331 358/1.12 |

(Continued)

*Primary Examiner* — Iman K Kholdebarin
(74) *Attorney, Agent, or Firm* — Gibb & Riley, LLC

(57) ABSTRACT

An image is received that contains handwritten characters as answers to an inquiry. An automatic character recognition process is performed on the image to generate initially recognized characters from the handwritten characters. The initially recognized characters of an incorrect answer to a question of the inquiry are analyzed to automatically identify alternative recognized characters of the incorrect answer. Then, it can be determined whether one or more of the alternative recognized characters, when substituted in place of the initially recognized characters of the incorrect answer, change the incorrect answer to a correct answer to the question. If the alternative recognized characters substituted in place of the initially recognized characters in the correct answer exceed a minimum character recognition confidence value, the incorrect answer is changed to the correct answer to modify the initially scored answers to modified scored answers, and such are output.

16 Claims, 7 Drawing Sheets

(56) References Cited

U.S. PATENT DOCUMENTS

| | | | |
|---|---|---|---|
| 2005/0128181 A1* | 6/2005 | Wang | G06K 9/00436 345/156 |
| 2005/0178839 A1* | 8/2005 | Grant | G06F 3/038 235/462.08 |
| 2005/0180661 A1* | 8/2005 | El Bernoussi | G06K 9/033 382/317 |
| 2006/0250660 A1* | 11/2006 | Cui | G06K 9/00442 358/448 |
| 2007/0248267 A1 | 10/2007 | Bar-av | |
| 2011/0217679 A1 | 9/2011 | Rosenblum | |
| 2012/0189999 A1 | 7/2012 | Uthman et al. | |
| 2012/0281919 A1* | 11/2012 | Abdulkader | G06K 9/34 382/177 |
| 2015/0302243 A1* | 10/2015 | Gross | G06K 9/00456 382/224 |
| 2016/0180727 A1* | 6/2016 | Gross | G09B 7/02 434/353 |

\* cited by examiner

| CUT COMBINATION 1 OF 6 | | | NODE VALUE 1ST CHAR | NODE VALUE 2ND CHAR | NODE VALUE 3RD CHAR | DISTANCE FROM "915" | ETC... |
|---|---|---|---|---|---|---|---|
| 1ST CHAR | 2ND CHAR | 3RD CHAR | | | | | |
| 9 | 1 | 5 | 0.95 | 0.94 | 0.99 | 0 | |
| 4 | 1 | 5 | 0.94 | 0.94 | 0.99 | 0.01 | |
| 9 | 7 | 5 | 0.95 | 0.9 | 0.99 | 0.04123 | |
| 4 | 7 | 5 | 0.94 | 0.9 | 0.99 | 0.04123 | |
| 3 | 6 | 3 | 0.8 | 0.8 | 0.8 | 0.27441 | |
| ETC... | | | | | | | |

FIG. 3

CONFIRMING AUTOMATICALLY RECOGNIZED HANDWRITTEN ANSWERS

BACKGROUND

Systems and methods herein generally relate to systems that automatically analyze handwritten answers, and more particularly, to methods and systems that confirm/correct automatically recognized handwritten answers.

Some systems convert hand-marked input, such as student work (on paper, tablets, etc.) into digital form to enable analytics. When used in the educational setting, such systems make it faster for teachers to evaluate student work and tailor instruction for specific student needs. The process of conversion from marks on paper to digital is at present sufficiently reliable for multiple choice or bubble fill-in type questions. Student alphanumeric handwriting, which still comprises a significant amount of student output, is however difficult to reliably interpret. This is especially the case when handwritten characters merge together (either advertently or as in script). The reading of handwriting is referred to as Intelligent Character Recognition and is sometimes abbreviated as "ICR."

SUMMARY

Briefly, with methods, systems, and devices herein an image is received that contains handwritten characters as answers to an inquiry. An automatic character recognition process is performed on the image to generate initially recognized characters from the handwritten characters. The initially recognized characters of an incorrect answer to a question of the inquiry are analyzed to automatically identify alternative recognized characters of the incorrect answer. Then, it can be determined whether one or more of the alternative recognized characters, when substituted in place of the initially recognized characters of the incorrect answer, change the incorrect answer to a correct answer to the question. If the alternative recognized characters substituted in place of the initially recognized characters in the correct answer exceed a minimum character recognition confidence value, the incorrect answer is changed to the correct answer to modify the initially scored answers to modified scored answers, and such are output.

Various methods herein receive an image into an image processor, and the image contains handwritten characters as answers to an inquiry. For example, the image can be obtained using a scanner or graphic user interface (e.g., one comprising a free-form input area for receiving user handwriting marks) that could be operatively (meaning directly or indirectly) connected to the image processor. The methods herein automatically perform an automatic character recognition process on the image to generate initially recognized characters from the handwritten characters, using the image processor. Such methods automatically determine whether the initially recognized characters represent correct answers or incorrect answers to the inquiry based on previously established correct and incorrect answers to produce initially scored answers, using the image processor.

Then, these methods automatically evaluate the initially recognized characters of an incorrect answer (of such previously scored incorrect answers) to a question of the inquiry to automatically identify alternative recognized characters of the incorrect answer. The alternative recognized characters of the incorrect answer can be generated by the automatic character recognition process; but are different from the initially recognized characters, and have lower character recognition confidence values relative to character recognition confidence values of the initially recognized characters of the incorrect answer (and therefore, were not selected as the initially recognized characters of the incorrect answers by the automatic character recognition process).

These methods can rely upon character recognition confidence values output by the original automatic character recognition process, or secondary automatic character recognition processes can be performed. For example, such secondary automatic character recognition processes can utilize different divisions distinguishing individual handwritten characters of the handwritten characters within the image. Thus, in one example, these methods can automatically determine the character recognition confidence values of the initially recognized characters based on a first division of the handwritten characters; and then automatically determine the lower character recognition confidence values of the alternative recognized characters based on a second division of the handwritten characters (that is different from the first division of the handwritten characters) using the image processor.

The methods herein also automatically determine whether one or more of the alternative recognized characters, substituted in place of the initially recognized characters of the incorrect answer, change the incorrect answer to a correct answer to the question (again, based on the previously established correct and incorrect answers, using the image processor). Following this, these methods automatically determine whether the lower character recognition confidence values of the alternative recognized characters substituted in place of the initially recognized characters in the correct answer exceed a minimum confidence value, using the image processor. If so, these methods automatically change the incorrect answer to the correct answer (e.g., based on the lower character recognition confidence values of the alternative recognized characters in the correct answer still exceeding the minimum confidence value) to modify the initially scored answers to modified scored answers, using the image processor. The methods herein automatically output the modified scored answers from the image processor, instead of outputting the initially scored answers.

Exemplary systems herein can include, among other components, a computerized device, an image processor operatively connected to the computerized device, a scanner operatively connected to the computerized device, a graphic user interface operatively connected to the computerized device, etc. The graphic user interface can include a free-form input area that receives user handwriting marks.

The computerized device receives an image into the image processor from the scanner and/or the graphic user interface. The image contains handwritten characters as answers to an inquiry. The computerized device automatically performs an automatic character recognition process on the image to generate initially recognized characters from the handwritten characters. The computerized device automatically determines whether the initially recognized characters represent correct answers or incorrect answers to the inquiry based on previously established correct and incorrect answers, to produce initially scored answers.

The computerized device automatically evaluates the initially recognized characters of an incorrect answer to a question of the inquiry (one of the previously identified incorrect answers) to automatically identify alternative recognized characters of the incorrect answer. The alternative recognized characters of the incorrect answer are generated by the automatic character recognition process, are different than the corresponding initially recognized characters, and have lower character recognition confidence values relative to character recognition confidence values of the initially recognized characters of the incorrect answer.

The computerized device automatically determines whether one or more of the alternative recognized characters substituted in place of the initially recognized characters of the incorrect answer change the incorrect answer to a correct answer to the question (based on the previously established correct and incorrect answers). The computerized device automatically determines whether the lower character recognition confidence values of the alternative recognized characters (substituted in place of the initially recognized characters in the correct answer) exceed a minimum confidence value. The computerized device automatically changes the incorrect answer to the correct answer based on the lower character recognition confidence values of the alternative recognized characters in the correct answer exceeding the minimum confidence value, to modify the initially scored answers to modified scored answers. The computerized device then automatically outputs the modified scored answers.

The computerized device can automatically determine the character recognition confidence values of the initially recognized characters based on a first division of the handwritten characters, and can determine the lower character recognition confidence values of the alternative recognized characters based on a second division of the handwritten characters that is different from the first division of the handwritten characters. The first division and the second division distinguish individual handwritten characters of the handwritten characters within the image.

Computerized devices herein utilize many operative (meaning direct or indirect) connections including a first connection to an image processor, a second connection to a scanner, a third connection to a graphic user interface, etc. The computerized device receives an image into the image processor from the scanner and/or the graphic user interface. The image contains handwritten characters as answers to an inquiry. The computerized device automatically performs an automatic character recognition process on the image to generate initially recognized characters from the handwritten characters. The computerized device also automatically determines whether the initially recognized characters represent correct answers or incorrect answers to the inquiry based on previously established correct and incorrect answers, to produce initially scored answers.

The computerized device then automatically evaluates the initially recognized characters of an incorrect answer (one of the incorrect answers) to a question of the inquiry to automatically identify alternative recognized characters of the incorrect answer. The alternative recognized characters of the incorrect answer are generated by the automatic character recognition process, are different than the corresponding initially recognized character, and have lower character recognition confidence values relative to character recognition confidence values of the initially recognized characters of the incorrect answer.

Then, the computerized device automatically determines whether one or more of the alternative recognized characters substituted in place of the initially recognized characters of the incorrect answer change the incorrect answer to a correct answer to the question based on the previously established correct and incorrect answers, using the image processor. The computerized device automatically determines whether the lower character recognition confidence values of the alternative recognized characters substituted in place of the initially recognized characters in the correct answer exceed a minimum confidence value. If so, the computerized device automatically changes the incorrect answer to the correct answer (again, based on the lower character recognition confidence values of the alternative recognized characters in the correct answer exceeding the minimum confidence value) to modify the initially scored answers to modified scored answers. The computerized device automatically outputs the modified scored answers.

Again, the computerized device can automatically determine the character recognition confidence values of the initially recognized characters based on a first division of the handwritten characters. The computerized device automatically determines the lower character recognition confidence values of the alternative recognized characters based on a second division of the handwritten characters that is different from the first division of the handwritten characters. The first division and the second division distinguish individual handwritten characters of the handwritten characters within the image from each other.

These and other features are described in, or are apparent from, the following detailed description.

BRIEF DESCRIPTION OF THE DRAWINGS

Various exemplary systems and methods are described in detail below, with reference to the attached drawing figures, in which:

FIG. 3 is a table illustrating processing performed by methods and devices herein;

DETAILED DESCRIPTION

As mentioned above, student alphanumeric handwriting, which comprises a significant amount of student output, is difficult to reliably interpret. Therefore, the systems and methods herein provide a nonparametric method to improve the accuracy of a grading system in which handwritten characters are interpreted. The demands on the grading system are simplified in that systems and methods herein first approach the task of determining a binary decision—is the correct answer written or not. If systems and methods herein conclude that the answer is written correctly, then the method terminates. If systems and methods herein conclude that the correct answer is not written, systems and methods herein attempt to determine specifically what was written to aide in analytics.

Making errors in determining what was written is not as critical as making errors in the binary correct/incorrect decision, since the educator will intervene if the question is determined to be answered incorrectly in order to understand the nature of the error the test recipient made. These methods provided here exploit the fact that knowledge of the correct answer to a question is known a-priori (the systems provided herein have the desirable property of knowing what should have been written, i.e. the correct answer to a question to which a student is responding).

The methods and systems herein first consider a set of character segmentation options. The classification output (e.g., a recognized alphanumeric character) of automated character recognition of each segmented region is then recorded. Along with the classifications is a weighting as to the confidence the system has that the output is in fact a specific character. For example, the weighting, also referred to loosely as a confidence level, may simply be the output of a neural net node for a given character, or may be a probability, if a Bayesian classification approach is taken. Then the methods and systems construct a set of distances between a query (e.g., the known correct answer to the question) and the most probable classification from the engine output. If the distance between the known correct answer to the question and the most probable classification is small, then systems and methods herein can reasonably conclude that the known correct answer to the question is in fact what has been written.

Figure 1:
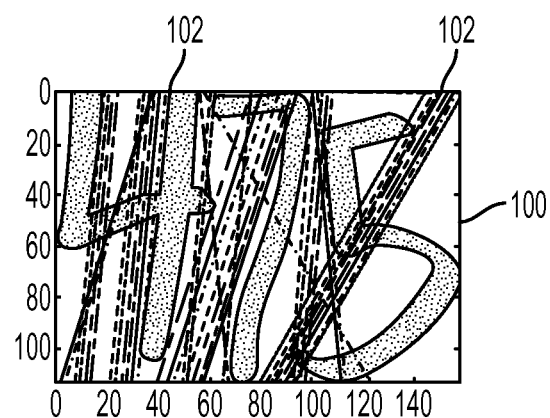
FIG. 1 is a schematic diagram illustrating divisions of images performed by methods and devices herein.

In one example, an answer to an exam question can have a 3-character string (numeric, alpha, or alphanumeric). The image is scanned, and a set of heuristics are applied that construct candidate cuts that are considered likely to separate characters. For example, FIG. 1 illustrates a portion of a digital image (obtained from a scan or digital handwritten input) 100 and candidate cut lines 102 that could potentially be used to separate characters.

In one example, the image can be segmented in the following process. For every other pixel in the middle row, six lines are drawn that pass through that pixel and with angles varying from 60 to 120 degrees. For every set of such lines, the one with max background to foreground pixels ratio is chosen. Then, consecutive similar cuts are merged. The cuts which intersect with more the one set of foreground pixels are removed, the cuts which intersect other cuts half way through the image are removed, and cuts where the number of foreground pixels between them are less than a threshold are removed.

Figure 2:
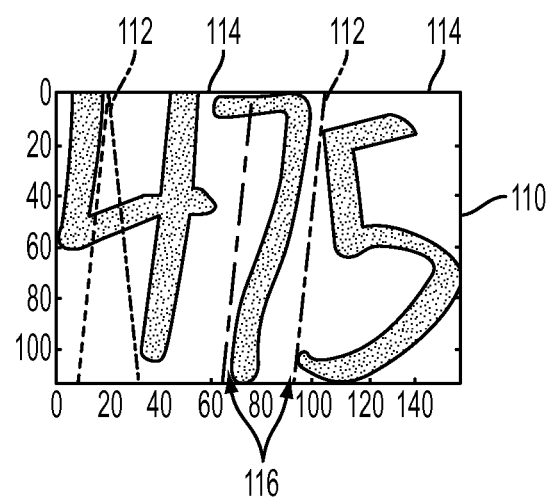
FIG. 2 is a schematic diagram illustrating divisions of images performed by methods and devices herein.

In one example shown in FIG. 2, for example, 4 cut lines 112 defining 6 segments 114 are established; however, since the known answer has 3 characters, if the student wrote the correct answer, then just two of the cuts need to be selected. Since there are 4 candidate cuts this results in 6 possible cut combinations. For each cut combination, the 3 segmented components are individually classified by the classification engine. For example, this engine can be a neural net, but any engine that provides a quantitative degree of confidence is suitable (such as a Bayesian method). In the case of the neural net, the magnitude of the output node is taken as the degree of confidence and following common practice the node with the largest output is considered the most likely correct classification.

If the student wrote the correct answer, then the image should be that of "475" as in the example above. For each possible cut combination, the specific cut that maximizes the probability of "475" being written is selected. From this cut, the top N (where N is empirically determined, perhaps 20 or so) most probable images are recorded. Not surprisingly "475" has a maximized probability for cut combination, the cuts on each side of the "7" that are identified using identification number 116 in FIG. 2.

With automated recognition engines, the most probable classification for cut combination using cuts 116 is "915" (here "4" is confused with "9," and "7" is confused with "1" because cuts 116 remove portions of "7" to form a "1" and such lost pixels are added to the "4" to cause it to be interpreted as a "9"). Specifically, as shown in the table in FIG. 3, each potentially interpreted character with neural net node output values of 0.95, 0.94, and 0.99. These are the maximum node outputs for each character. For that same cut, "475" had neural net output node values of 0.94, 0.9 and 0.99. Here "closest" is defined in terms of the Euclidean distance, but any metric can be applied. Many iterations of such processing can be performed to refine such analysis.

The distance from "475" to the most probable classification (without any a priori information) is 0.04123 as shown in the table in FIG. 3. If this distance is small enough (below a defined threshold) or the string "475" is among the top K strings closest to the most probably "915", then systems and methods herein conclude that "475" is in fact what was written (and that "915" was not actually written).

Figure 4:
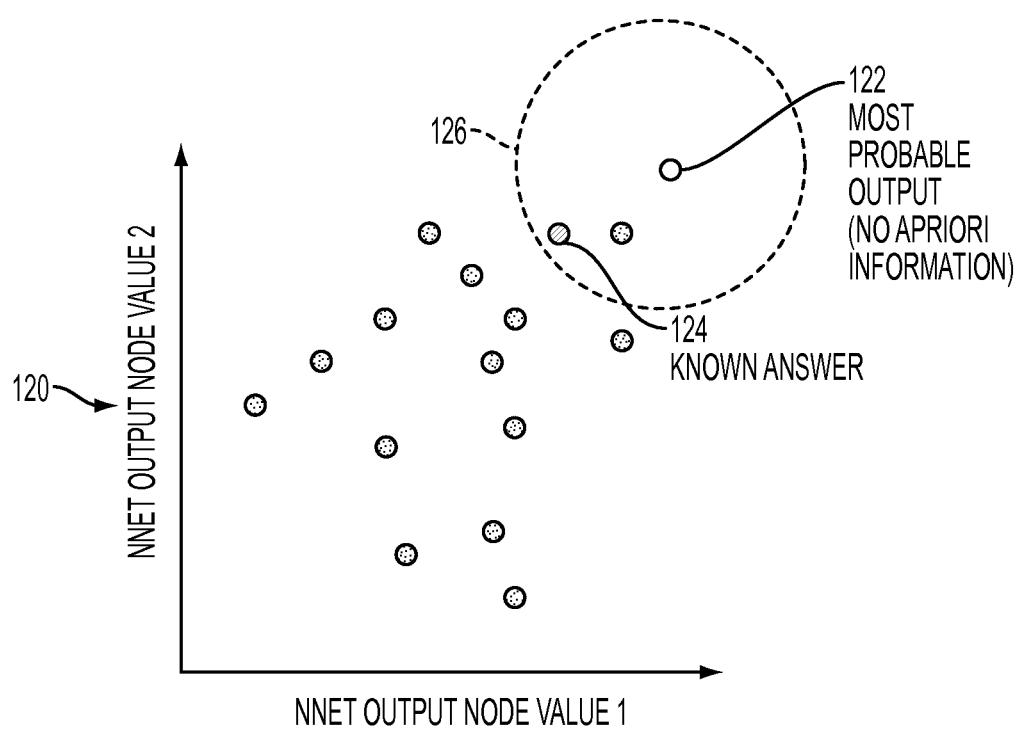
FIG. 4 is a chart illustrating processing performed by methods and devices herein.

This concept is illustrated in FIG. 4. In FIG. 4, two dimensions 120 are used to illustrate the idea, but for the example illustrated above with known answer of "475", the illustration would actually be in three dimensions. In the graph shown in FIG. 4, it can be seen that that the answer 124 is the 3rd closest to the most probable classification output from the neural net 122. There are a total of 16 other "words" with corresponding farther distances. The likelihood of the answer being within the top 3 is $3/16$. Since this is small and so unlikely due to chance, the hypothesis that the answer is in fact what is written in the image is not rejected. A threshold level (represented by the dotted line 126 in FIG. 4) is required to determine at what level the hypothesis is accepted or rejected, and this has implications for the false positive and false negative rates. This is similar to specifying a "p-value" threshold at 1%, 5%, etc. . . . in the field of statistical inference. In one implementation, the threshold can be a parameter that is set by the user to obtain the error rates most suitable to the application.

Figure 5:
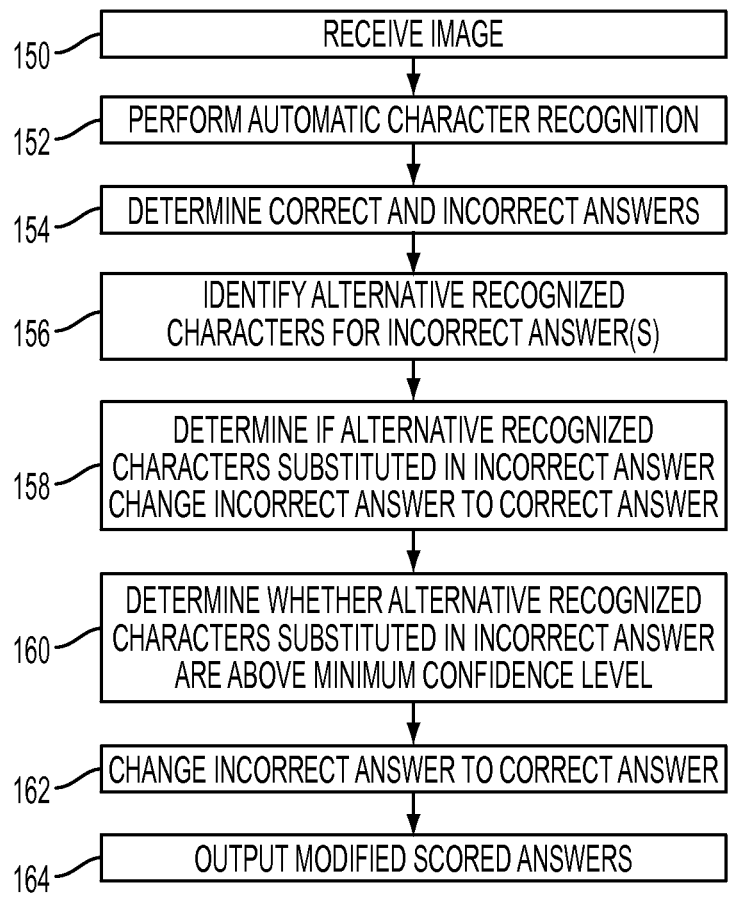
FIG. 5 is a flow diagram of various methods herein.

FIG. 5 is flowchart illustrating exemplary methods herein. In item 150, these methods receive an image (e.g., scanned image, digitally acquired image from user input device, etc.) into an image processor. Such an image contains some user-supplied marks (e.g., human handwritten characters) as answers to an inquiry (such as a test with blanks for students to provide longhand alphanumeric answers; or other user-fillable forms where users provide names, addresses, zip codes, credit card information, social security numbers, etc., and where such information may be known or implied (partially or fully) a-priori). While a student's answer to a test question is used in the examples herein, those ordinarily skilled in the art would understand that the user's handwritten response could be to any inquiry, and the "correct" or "incorrect" answer to that inquiry may be based upon whether the user supplies a valid zip code, a valid credit card number, a valid street address, reasonable salary figures, one of many expected answers to a question, etc. Therefore, the methods and devices herein are not limited to student answers on a test, but are applicable to any user's handwritten response to any inquiry.

For example, in item 150, the image can be obtained using an optical scanner (scanning a sheet containing user markings) or graphic user interface that could be operatively (meaning directly or indirectly) connected to the image processor. For example, the graphic user interface device can be a touchscreen for obtaining human handwriting, such as one comprising a free-form input area (e.g., tablet, smartphone, or touchpad) for receiving user handwriting marks from human fingers or a special pen, etc.

In item 152, the methods herein automatically perform an automatic handwriting character recognition process (e.g., Intelligent Character Recognition (ICR)) on the image to generate initially recognized characters from the handwritten characters (e.g., using a special-purpose processor, such as the image processor). As is understood by those ordinarily skilled in the art, automatic handwriting character recognition processes such as that in item 152 involve matching patterns of pixels to known patterns of alphanumeric characters in highly sophisticated processes that use modeling, prediction, filtering, confidence values, etc., and the initially recognized characters are selected from many possible characters and are those that are considered to be the most likely characters, based on the shapes and positions of the user markings (without any regard to the correct, expected answer).

In item 154, such methods automatically determine whether the initially recognized characters represent correct answers or incorrect answers to the inquiry by comparing the combination of the initially recognized characters (e.g., combined into words, sentences, multi-digit numbers, etc.) to a previously established set of correct and incorrect answers. The processing in item 154 produces initially scored answers and can be performed using a processor, such as the image processor or any other suitable processor.

Then, in item 156 these methods automatically evaluate the initially recognized characters of at least one of the incorrect answers (such previously scored incorrect answers from item 154) to a question of the inquiry to automatically identify alternative recognized characters of the incorrect answer. The alternative recognized characters of the incorrect answer can be generated in item 156 by the same automatic character recognition process in item 152. Such alternative recognized characters are different from the corresponding initially recognized characters. Further, the alternative recognized characters have lower character recognition confidence values relative to character recognition confidence values of the initially recognized characters of the incorrect answer. Therefore, because of their lower confidence values, the alternative recognized characters were not selected as the initially recognized characters of the incorrect answers by the automatic character recognition process in item 152 and, instead, the initially recognized characters were selected.

When automatically identifying alternative recognized characters of the incorrect answer in item 156, these methods can rely upon character recognition confidence values output by the original automatic character recognition process, or secondary automatic character recognition processes can be performed. For example, such secondary automatic character recognition processes can utilize different divisions distinguishing individual handwritten characters of the handwritten characters within the image (e.g., see divisions 112, 114, 116 in FIG. 2). Thus, in one example, these methods can automatically determine the character recognition confidence values of the initially recognized characters based on a first division of the handwritten characters in item 152; and then automatically determine the lower character recognition confidence values of the alternative recognized characters based on a second division of the handwritten characters in item 156 (that is different from the first division of the handwritten characters). In another example, the process can simply refer to the confidence values in the output from the original automatic character recognition process, without repeating the automatic character recognition process.

In item 158, the methods herein also automatically determine whether one or more of the alternative recognized characters, substituted in place of the initially recognized characters of the incorrect answer, change the incorrect answer to a correct answer to the question (again, based on the previously established correct and incorrect answers, using the image processor). In other words, during the automatic character recognition process in item 152, the processing may determine that a user's handwritten marks could potentially be different alphanumeric characters (e.g., could be a "7" or a "1" using the "7" in FIGS. 1 and 2 as an example). However, because of various character recognition confidence measures, the automatic character recognition process in item 152 may interpret the user's marks to be a "1." Therefore, character "7" would not be an initially recognized character because character recognition confidence for character "7" was relatively lower than character recognition confidence for character "1," which was selected by the automatic character recognition process as an initially recognized character (for the middle character in FIGS. 1 and 2).

However, item 158 revisits the automatic character recognition process (either unchanged, or with revised divisions) to see if some lower confidence characters (for the middle character in FIGS. 1 and 2, in this example) may supply the correct answer, when substituted in place of the initially recognized characters of the incorrect answer. This can be done on a character-by-character basis so that some or all of the characters in an incorrect answer are substituted until the correct answer is obtained (and the correct answer may not be obtained if there are not sufficient alternative recognized characters that result in the correct answer).

Following this, in item 160, these methods automatically determine whether the lower character recognition confidence values of the alternative recognized characters substituted in place of the initially recognized characters in the correct answer exceed a minimum confidence value (see Table in FIG. 3). If so, in item 162 these methods automatically change the incorrect answer to the correct answer (e.g., based on the lower character recognition confidence values of the alternative recognized characters in the correct answer still exceeding the minimum confidence value) to modify the initially scored answers to modified scored answers, using the image processor. However, if there are not sufficient alternative recognized characters that can be formed from the user's marks to create the correct answer or if the lower character recognition confidence values of the alternative recognized characters do not exceed the minimum confidence value, the answer will be left as an incorrect answer. The methods herein automatically output the modified scored answers from the image processor in item 164, instead of outputting the initially scored answers.

The hardware described herein plays a significant part in permitting the foregoing method to be performed, rather than function solely as a mechanism for permitting a solution to be achieved more quickly, (i.e., through the utilization of a computer for performing calculations). As would be understood by one ordinarily skilled in the art, the processes described herein cannot be performed by human alone (or one operating with a pen and a pad of paper) and instead such processes can only be performed by a machine. Specifically, processes such as image scanning, obtaining user input through touchscreens, automatically recognizing characters based on pixel analysis of digital images, etc., require the utilization of different specialized machines. Therefore, for example, the automatic character recognition performed by the user device cannot be performed manually and is integral with the processes performed by methods herein. Further, such machine-only processes are not mere "post-solution activity" because the substitution of correct answers for previously identified incorrect answers of the methods herein rely upon the confidence values obtained during the automated character recognition processes, and cannot be performed without such electronic devices. In other words, these various machines are integral with the methods herein because the methods cannot be performed without the machines (and cannot be performed by humans alone).

Additionally, the methods herein solve many highly complex technological problems. For example, as mentioned above, handwriting recognition systems suffer from the technological problem of not accurately recognizing free-form handwritten entries. Methods herein solve this technological problem by using the known, expected answer to identify whether the previous handwriting recognition may have been incorrect. By granting such benefits to teaches, exam graders, those evaluating user responses on forms, etc., the methods herein reduce the amount and complexity of hardware and software needed to be purchased, installed, and maintained by providers, thereby solving a substantial technological problem that providers experience today.

Figure 6:
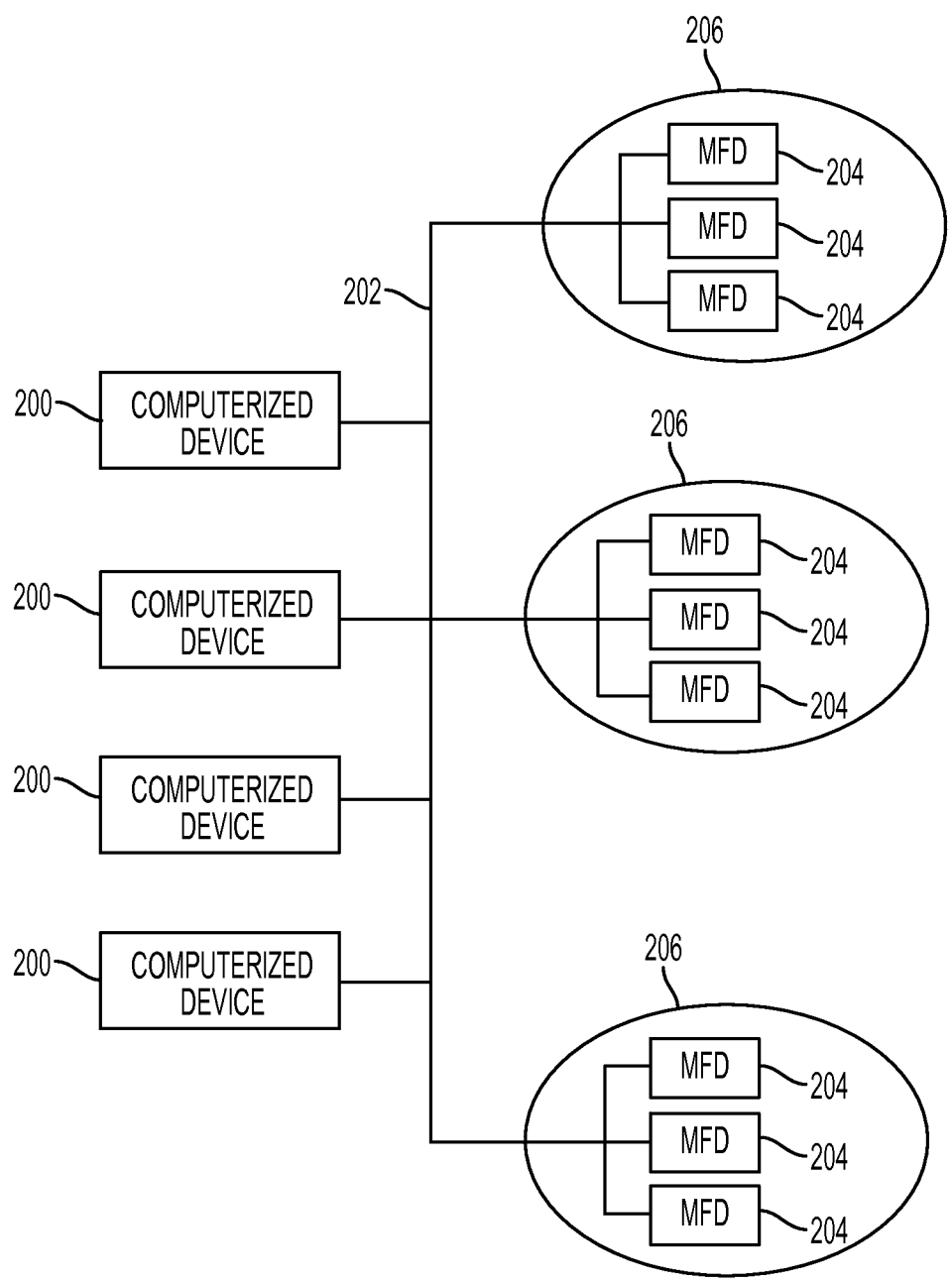
FIG. 6 is a schematic diagram illustrating systems herein.

As shown in FIG. 6, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 7:
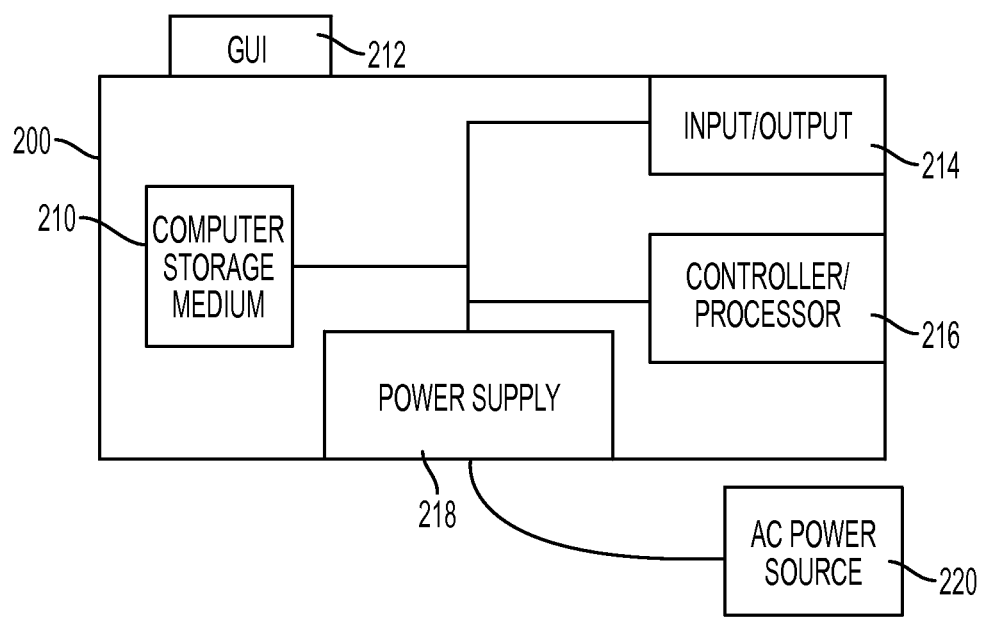
FIG. 7 is a schematic diagram illustrating devices herein.

FIG. 7 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 7, a body housing has one or more functional components that operate on power supplied from an alternating current (AC) source 220 by the power supply 218. The power supply 218 can comprise a common power conversion unit, power storage element (e.g., a battery, etc), etc.

Figure 8:
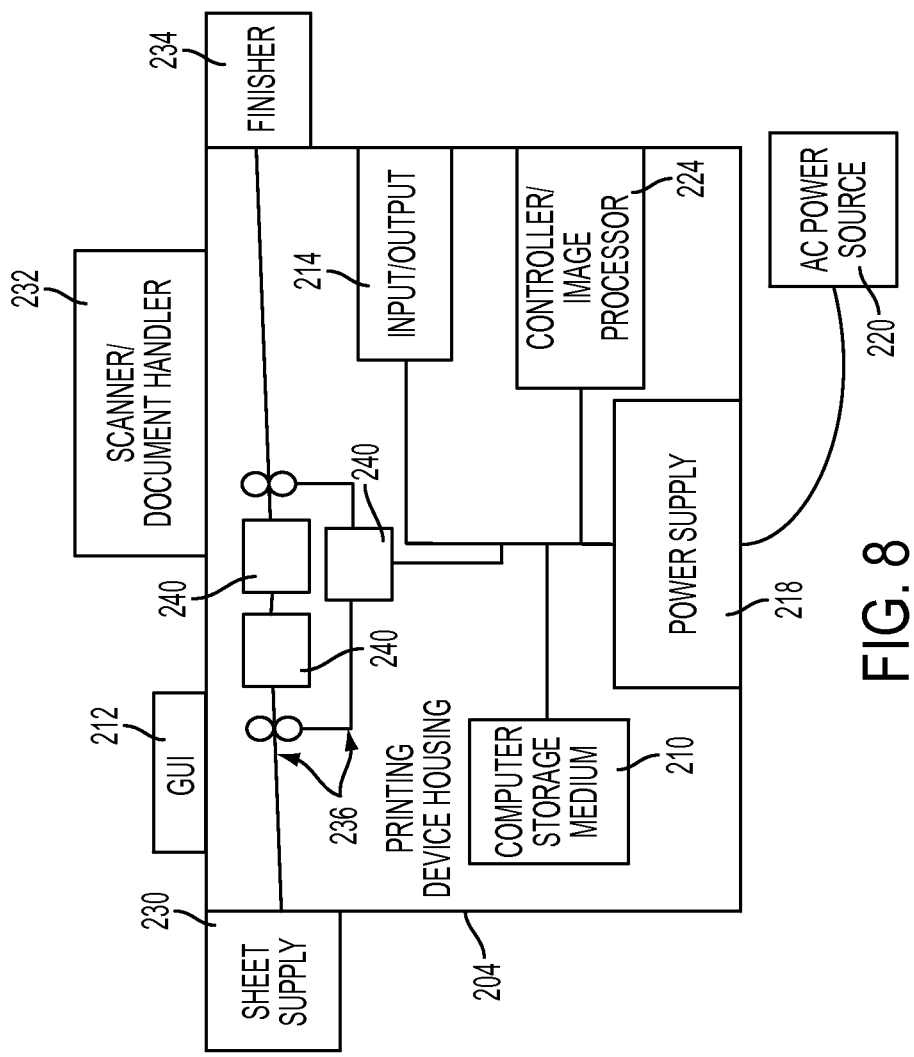
FIG. 8 is a schematic diagram illustrating devices herein.

FIG. 8 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

Such devices are special-purpose devices distinguished from general-purpose computers because such devices include specialized hardware, such as: scanners 232, specialized processors 224 (e.g., containing specialized filters, buffers, application specific integrated circuits (ASICs), ports, etc.) that are specialized for image processing, etc.; specialized graphic user interfaces 212 (that are specialized for receiving user handwritten input, reduced size, antiglare, etc.).

Exemplary systems herein can include, among other components, a computerized device 200/204, an image processor 224 operatively connected to the computerized device 200/204, a scanner 232 operatively connected to the computerized device 200/204, a graphic user interface 212 operatively connected to the computerized device 200/204, etc. The graphic user interface 212 can include a free-form input area that receives user handwriting marks.

The computerized device 200/204 receives an image into the image processor 224 from the scanner 232 and/or the graphic user interface 212. The image contains handwritten characters as answers to an inquiry. The computerized device 200/204 automatically performs an automatic character recognition process on the image to generate initially recognized characters from the handwritten characters. The computerized device 200/204 automatically determines whether the initially recognized characters represent correct answers or incorrect answers to the inquiry based on previously established correct and incorrect answers, to produce initially scored answers.

The computerized device 200/204 automatically evaluates the initially recognized characters of an incorrect answer to a question of the inquiry (one of the previously identified incorrect answers) to automatically identify alternative recognized characters of the incorrect answer. The alternative recognized characters of the incorrect answer are generated by the automatic character recognition process, are different than the corresponding initially recognized characters, and have lower character recognition confidence values relative to character recognition confidence values of the initially recognized characters of the incorrect answer.

The computerized device 200/204 automatically determines whether one or more of the alternative recognized characters substituted in place of the initially recognized characters of the incorrect answer change the incorrect answer to a correct answer to the question (based on the previously established correct and incorrect answers). The computerized device 200/204 automatically determines whether the lower character recognition confidence values of the alternative recognized characters (substituted in place of the initially recognized characters in the correct answer) exceed a minimum confidence value. The computerized device 200/204 automatically changes the incorrect answer to the correct answer based on the lower character recognition confidence values of the alternative recognized characters in the correct answer exceeding the minimum confidence value, to modify the initially scored answers to modified scored answers. The computerized device 200/204 then automatically outputs the modified scored answers.

The computerized device 200/204 can automatically determine the character recognition confidence values of the initially recognized characters based on a first division of the handwritten characters, and can determine the lower character recognition confidence values of the alternative recognized characters based on a second division of the handwritten characters that is different from the first division of the handwritten characters. The first division and the second division distinguish individual handwritten characters of the handwritten characters within the image.

Computerized devices 200/204 herein utilize many operative (meaning direct or indirect) connections including a first connection to an image processor 224, a second connection to a scanner 232, a third connection to a graphic user interface 212, etc. The computerized device 200/204 receives an image into the image processor 224 from the scanner 232 and/or the graphic user interface 212. The image contains handwritten characters as answers to an inquiry. The computerized device 200/204 automatically performs an automatic character recognition process on the image to generate initially recognized characters from the handwritten characters. The computerized device 200/204 also automatically determines whether the initially recognized characters represent correct answers or incorrect answers to the inquiry based on previously established correct and incorrect answers, to produce initially scored answers.

The computerized device 200/204 then automatically evaluates the initially recognized characters of an incorrect answer (one of the incorrect answers) to a question of the inquiry to automatically identify alternative recognized characters of the incorrect answer. The alternative recognized characters of the incorrect answer are generated by the automatic character recognition process, are different than the corresponding initially recognized character, and have lower character recognition confidence values relative to character recognition confidence values of the initially recognized characters of the incorrect answer.

Then, the computerized device 200/204 automatically determines whether one or more of the alternative recognized characters substituted in place of the initially recognized characters of the incorrect answer change the incorrect answer to a correct answer to the question based on the previously established correct and incorrect answers, using the image processor 224. The computerized device 200/204 automatically determines whether the lower character recognition confidence values of the alternative recognized characters substituted in place of the initially recognized characters in the correct answer exceed a minimum confidence value. If so, the computerized device 200/204 automatically changes the incorrect answer to the correct answer (again, based on the lower character recognition confidence values of the alternative recognized characters in the correct answer exceeding the minimum confidence value) to modify the initially scored answers to modified scored answers. The computerized device 200/204 automatically outputs the modified scored answers.

Again, the computerized device 200/204 can automatically determine the character recognition confidence values of the initially recognized characters based on a first division of the handwritten characters. The computerized device 200/204 automatically determines the lower character recognition confidence values of the alternative recognized characters based on a second division of the handwritten characters that is different from the first division of the handwritten characters. The first division and the second division distinguish individual handwritten characters of the handwritten characters within the image from each other.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
  receiving an image into an image processor, said image containing handwritten characters as answers to an inquiry;
  performing an automatic character recognition process on said image to generate initially recognized characters from said handwritten characters based on a first division of said handwritten characters by determining character recognition confidence values of said initially recognized characters based on said first division of said handwritten characters;

evaluating said initially recognized characters of an incorrect answer to a question of said inquiry to automatically identify alternative recognized characters of said incorrect answer based on a second division of said handwritten characters that is different from said first division of said handwritten characters by determining character recognition confidence values of said alternative recognized characters based on said second division of said handwritten characters that is different from said first division of said handwritten characters;

determining whether said one or more of said alternative recognized characters substituted in place of said initially recognized characters of said incorrect answer change said incorrect answer to a correct answer to said question;

determining whether said alternative recognized characters substituted in place of said initially recognized characters in said correct answer exceed a minimum character recognition confidence value;

changing said incorrect answer to said correct answer based on said alternative recognized characters in said correct answer exceeding said minimum character recognition confidence value, to produce modified scored answers; and outputting said modified scored answers.

2. The method according to claim 1, said first division and said second division distinguishing individual handwritten characters of said handwritten characters within said image.

3. The method according to claim 1, said alternative recognized characters being different from corresponding ones of said initially recognized characters.

4. The method according to claim 1, further comprising obtaining said image from at least one of:
   a scanner operatively connected to said image processor; and
   a graphic user interface comprising a free-form input area receiving user handwriting marks, operatively connected to said image processor.

5. A method comprising:
   receiving an image into an image processor, said image containing handwritten characters as answers to an inquiry;
   automatically performing an automatic character recognition process on said image to generate initially recognized characters from said handwritten characters based on a first division of said handwritten characters by determining character recognition confidence values of said initially recognized characters based on said first division of said handwritten characters, using said image processor;
   automatically determining whether said initially recognized characters represent correct answers or incorrect answers to said inquiry based on previously established correct and incorrect answers, to produce initially scored answers, using said image processor;
   automatically evaluating said initially recognized characters of an incorrect answer, of said incorrect answers, to a question of said inquiry to automatically identify alternative recognized characters of said incorrect answer based on a second division of said handwritten characters that is different from said first division of said handwritten characters by determining character recognition confidence values of said alternative recognized characters based on said second division of said handwritten characters that is different from said first division of said handwritten characters, said alternative recognized characters of said incorrect answer being generated by said automatic character recognition process and having lower character recognition confidence values relative to character recognition confidence values of said initially recognized characters of said incorrect answer;
   automatically determining whether said one or more of said alternative recognized characters substituted in place of said initially recognized characters of said incorrect answer change said incorrect answer to a correct answer to said question based on said previously established correct and incorrect answers, using said image processor;
   automatically determining whether said lower character recognition confidence values of said alternative recognized characters substituted in place of said initially recognized characters in said correct answer exceed a minimum confidence value, using said image processor;
   automatically changing said incorrect answer to said correct answer based on said lower character recognition confidence values of said alternative recognized characters in said correct answer exceeding said minimum confidence value, to modify said initially scored answers to modified scored answers, using said image processor; and
   automatically outputting said modified scored answers from said image processor.

6. The method according to claim 5, said first division and said second division distinguishing individual handwritten characters of said handwritten characters within said image.

7. The method according to claim 5, said alternative recognized characters being different from corresponding ones of said initially recognized characters.

8. The method according to claim 5, further comprising obtaining said image from at least one of:
   a scanner operatively connected to said image processor; and
   a graphic user interface comprising a free-form input area receiving user handwriting marks, operatively connected to said image processor.

9. A system comprising:
   a computerized device;
   an image processor operatively connected to said computerized device;
   a scanner operatively connected to said computerized device; and
   a graphic user interface operatively connected to said computerized device,
   said computerized device receiving an image into said image processor from at least one of said scanner and said graphic user interface,
   said image containing handwritten characters as answers to an inquiry,
   said computerized device automatically performing an automatic character recognition process on said image to generate initially recognized characters from said handwritten characters based on a first division of said handwritten characters by determining character recognition confidence values of said initially recognized characters based on said first division of said handwritten characters,
   said computerized device automatically determining whether said initially recognized characters represent correct answers or incorrect answers to said inquiry based on previously established correct and incorrect answers, to produce initially scored answers, said computerized device automatically evaluating said initially recognized characters of an incorrect answer, of said incorrect answers, to a question of said inquiry to automatically identify alternative recognized characters of said incorrect answer based on a second division of said handwritten characters that is different from said first division of said handwritten characters by determining character recognition confidence values of said alternative recognized characters based on said second division of said handwritten characters that is different from said first division of said handwritten characters, said alternative recognized characters of said incorrect answer being generated by said automatic character recognition process and having lower character recognition confidence values relative to character recognition confidence values of said initially recognized characters of said incorrect answer, said computerized device automatically determining whether said one or more of said alternative recognized characters substituted in place of said initially recognized characters of said incorrect answer change said incorrect answer to a correct answer to said question based on said previously established correct and incorrect answers, said computerized device automatically determining whether said lower character recognition confidence values of said alternative recognized characters substituted in place of said initially recognized characters in said correct answer exceed a minimum confidence value, said computerized device automatically changing said incorrect answer to said correct answer based on said lower character recognition confidence values of said alternative recognized characters in said correct answer exceeding said minimum confidence value, to modify said initially scored answers to modified scored answers, and said computerized device automatically outputting said modified scored answers.

10. The system according to claim 9, said first division and said second division distinguishing individual handwritten characters of said handwritten characters within said image.

11. The system according to claim 9, said alternative recognized characters being different from corresponding ones of said initially recognized characters.

12. The system according to claim 9, said graphic user interface comprising a free-form input area receiving user handwriting marks.

13. A computerized device comprising:
a first connection to an image processor;
a second connection to a scanner; and
a third connection to a graphic user interface,
said computerized device receiving an image into said image processor from at least one of said scanner and said graphic user interface,
said image containing handwritten characters as answers to an inquiry,
said computerized device automatically performing an automatic character recognition process on said image to generate initially recognized characters from said handwritten characters based on a first division of said handwritten characters by determining character recognition confidence values of said initially recognized characters based on said first division of said handwritten characters, said computerized device automatically determining whether said initially recognized characters represent correct answers or incorrect answers to said inquiry based on previously established correct and incorrect answers, to produce initially scored answers, said computerized device automatically evaluating said initially recognized characters of an incorrect answer, of said incorrect answers, to a question of said inquiry to automatically identify alternative recognized characters of said incorrect answer based on a second division of said handwritten characters that is different from said first division of said handwritten characters by determining character recognition confidence values of said alternative recognized characters based on said second division of said handwritten characters that is different from said first division of said handwritten characters, said alternative recognized characters of said incorrect answer being generated by said automatic character recognition process and having lower character recognition confidence values relative to character recognition confidence values of said initially recognized characters of said incorrect answer, said computerized device automatically determining whether said one or more of said alternative recognized characters substituted in place of said initially recognized characters of said incorrect answer change said incorrect answer to a correct answer to said question based on said previously established correct and incorrect answers, said computerized device automatically determining whether said lower character recognition confidence values of said alternative recognized characters substituted in place of said initially recognized characters in said correct answer exceed a minimum confidence value, said computerized device automatically changing said incorrect answer to said correct answer based on said lower character recognition confidence values of said alternative recognized characters in said correct answer exceeding said minimum confidence value, to modify said initially scored answers to modified scored answers, and said computerized device automatically outputting said modified scored answers.

14. The computerized device according to claim 13, said first division and said second division distinguishing individual handwritten characters of said handwritten characters within said image.

15. The computerized device according to claim 13, said alternative recognized characters being different from corresponding ones of said initially recognized characters.

16. The computerized device according to claim 13, said graphic user interface comprising a free-form input area receiving user handwriting marks.

* * * * *